United States Patent Office 3,655,877
Patented Apr. 11, 1972

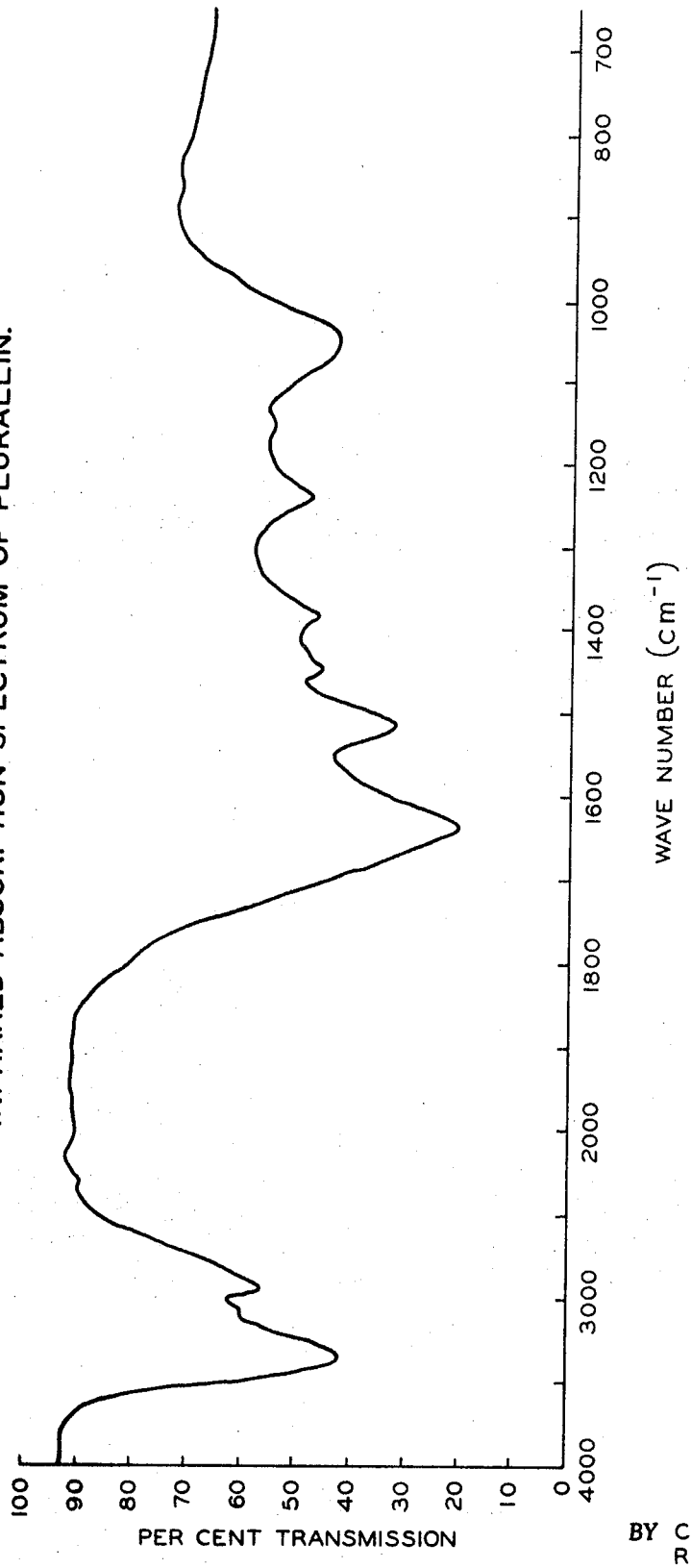

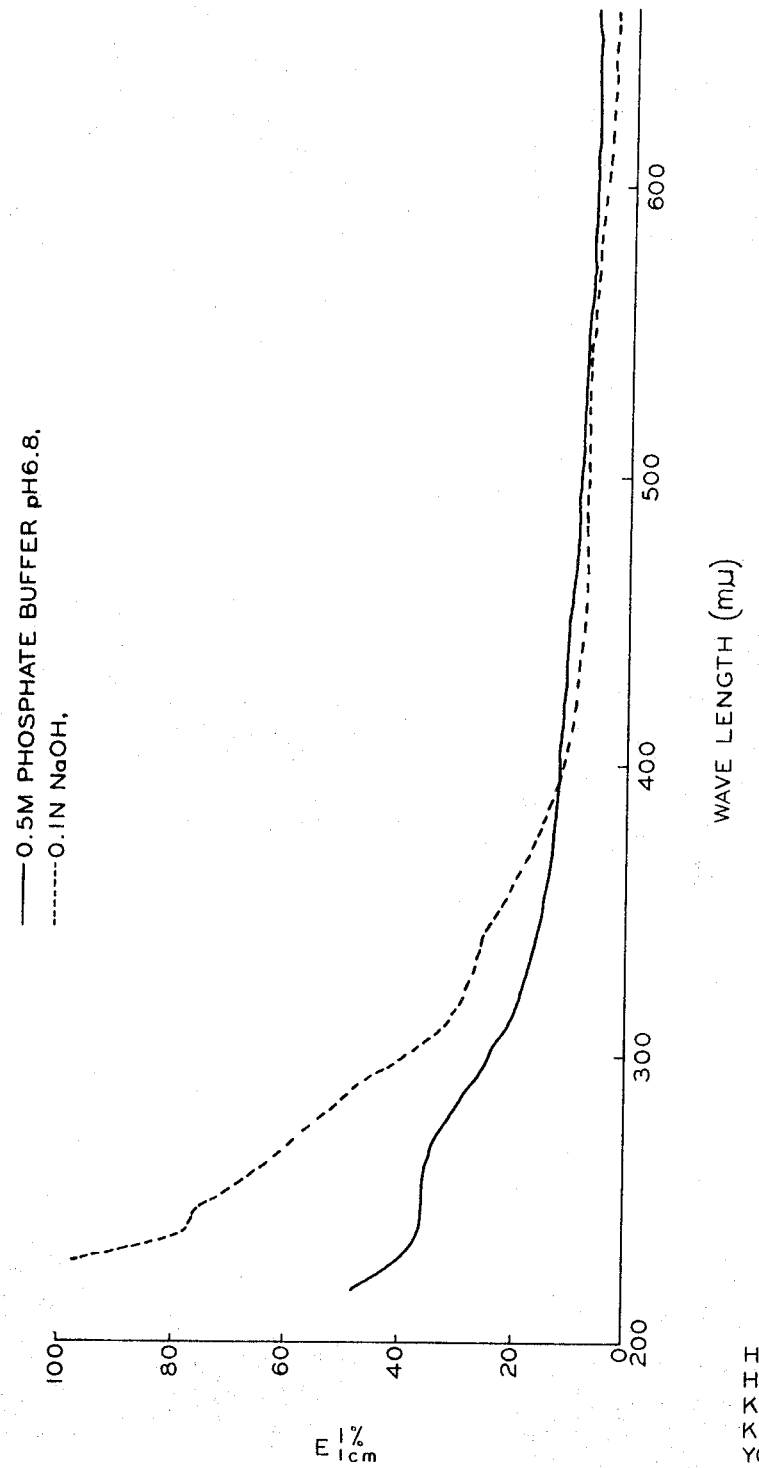

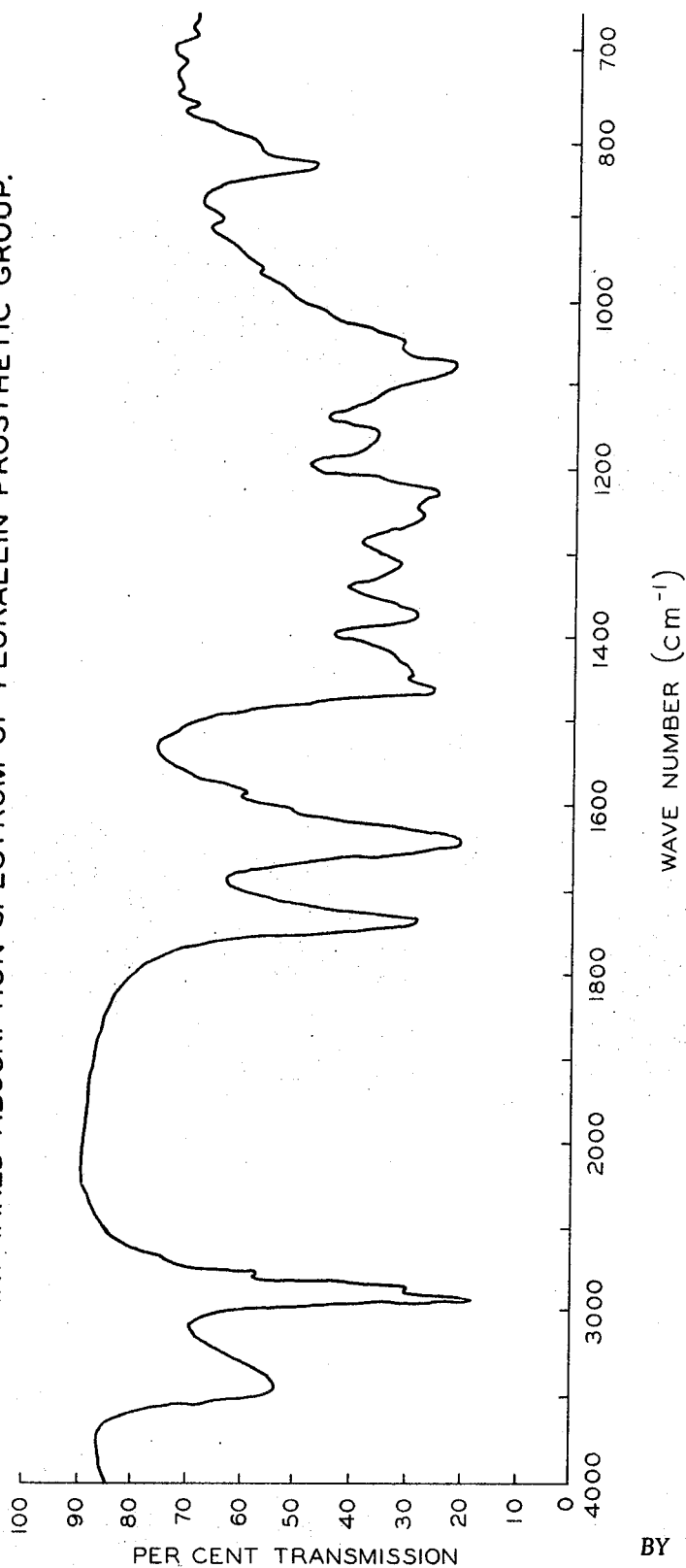

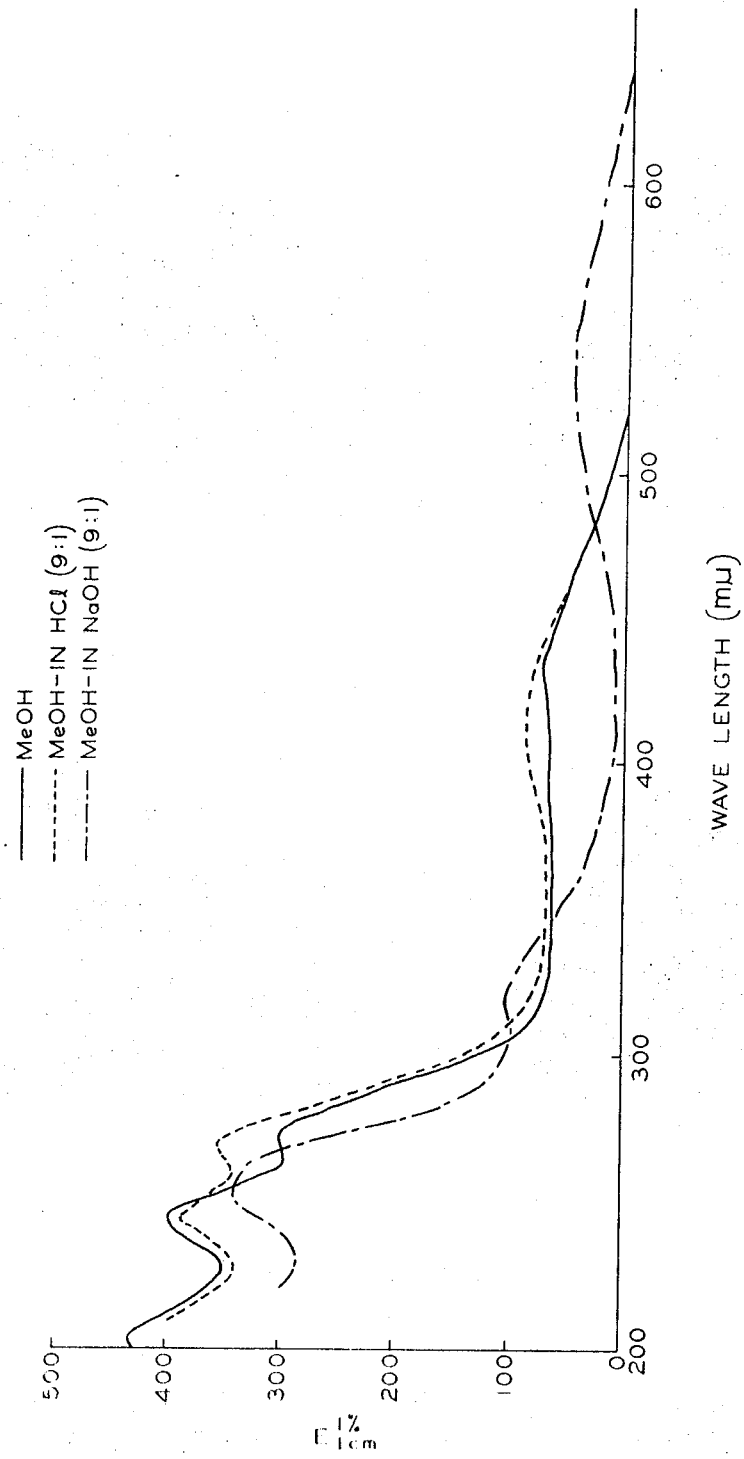

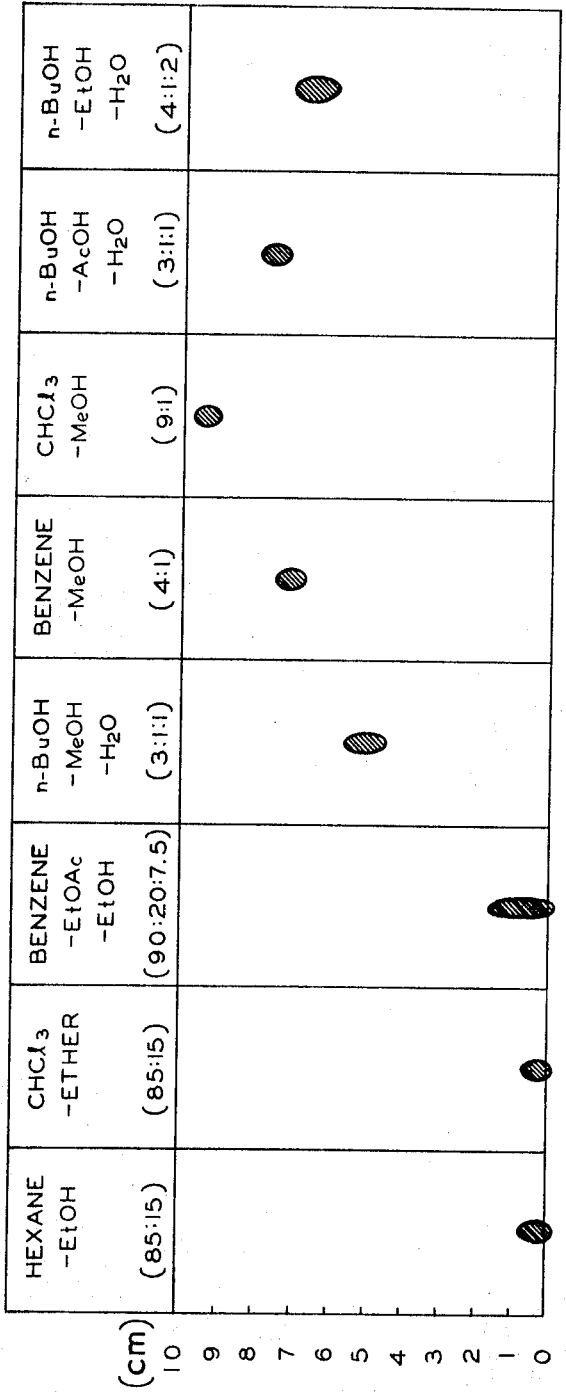

3,655,877
PLURALLIN AND PRODUCTION THEREOF
Hamao Umezawa, 23 Kita, 2-chome, Nerima-ku; Kenji Maeda, 258 Gotanda, 1-chome, Shinagawa-ku; Tomio Takeuchi, 273 Imazumicho, Ota-ku; Kazuo Nitta, 24 Irumacho, 1-chome, Chofu-shi; Yoshiro Okami, 18-3 6-chome, Denenchofu, Ohta-ku; and Hiroshi Ogawara, 33-9 Yushima, 2-chome, Bunkyo-ku, all of Tokyo, Japan
Filed Jan. 4, 1966, Ser. No. 518,661
Int. Cl. A61k 21/00
U.S. Cl. 424—117                                         4 Claims

ABSTRACT OF THE DISCLOSURE

The antibiotic substance designated plurallin and comprising a glycoprotein and a pluramycin-like prosthetic group, is produced by fermentation of *Streptomyces pluricolorescens* A.T.C.C. 19145 and found to inhibit the growth of *Corynebacterium xerosis*.

---

This invention relates to a new and useful antibiotic, plurallin, and its production. The invention further relates to processes for its production by fermentation and methods for its recovery, purification and conversion to metal and acid addition salts. The invention embraces the antibiotic and its salts in dilute solutions, as crude concentrates and as purified solids.

There is provided according to the present invention a member selected from the group consisting of an antibiotic substance, designated plurallin and comprising a glycoprotein and a pluramycin-like prosthetic group, which is effective in inhibiting the growth of *Sarcina lutea*, *Mycobacterium phlei* and *Corynebacterium xerosis* 53 Kl. Initial isolation of the active substance from a culture filtrate yielded a powder. Chromatography indicated a molecular weight of 30,000–60,000 for the impure active substance. Therefore, properties of the powder were studied. The high nitrogen content shown by elemental analysis initially indicated the active substance to be of a protein nature. The analytical result was as follows: C, 50.01, H, 7.23, N, 10.89, O, 25.74, S, 0.94, ash 0.161 mg./2.460 mg. The emission analysis of the ash indicated traces of iron, magnesium, calcium, copper, aluminum, silicon and zinc, but none of lead, manganese, titanium, sodium and potassium. The amide linkage was shown at 1640, 1515, 1230 cm.$^{-1}$, in the infrared spectrum which showed bands at the following wave lengths: 3320, 3080, 2930, 1640, 1515, 1455, 1385, 1230, 1150, 1065, 715 cm.$^{-1}$ (shown in FIG. 1). The following amino acids were shown by the amino acid analysis of the hydrolysate obtained by reflux in 6 N HCl at 110° C. for 32 hours: lysine (2.86), histidine (1.45), ammonia (11.78), arginine (2.71), aspartic acid (9.27), threonine (3.64), serine (5.53), glutamic acid (9.42), proline (3.71), glycine (5.74), alanine (6.00), cystine (2.30 as cysteine), valine (6.00), methionine (0.88), isoleucine (4.71), leucine (8.16), tyrosine (2.51) and phenylalanine (3.80) (the numbers in parentheses indicate the molar ratios). It gave positive Elson-Morgan, cysteine-sulfuric acid, xanthoprotein, Hopkins-Cole and Sakaguchi tests but gave negative Tollens and ferric chloride tests. Determination by orcinol method indicated 6.83% of hexose and the ratio of mannose/galactose shown by the optical density of the reaction product was 6.7. Determination by the Elson-Morgan method indicated 2.47% of hexosamine and the cysteine-sulfate method indicated 0.49% of methylpentose. Thus, the substance was shown to be a glycoprotein. The ultraviolet absorption spectrum (FIG. 2) was as follows: shoulder at 257 m$\mu$ ($E_{1\,cm.}^{1\%}$ 35.5) and 280 m$\mu$ ($E_{1\,cm.}^{1\%}$ 30.7)

in phosphate buffer of pH 6.8, shoulder at 245 m$\mu$ ($E_{1\,cm.}^{1\%}$ 76) and 275 m$\mu$ ($E_{1\,cm.}^{1\%}$ 56)

in 0.1 N NaOH. This absorption spectrum, and the reddish brown color of the powder which was not removed by chromatography, suggested that a chromophoric prosthetic group was responsible for the activity.

The prosthetic group was not separated from the glycoprotein by extraction with methanol, ethanol, acetone, butanol, chloroform or benzene, however, it was separated by extraction with glacial acetic acid at room temperature. The extract was orange-red in color and lyophilization of the extract gave a reddish brown powder having a 3–6 times stronger activity *Corynebacterium xerosis* than the starting material. The alumina chromatography of this extract dissolved in chloroform and elution with chloroform-methanol (95:5) after washing with chloroform followed by drying under vacuum yielded a brownish red powder. The singularity was shown by thin layer chromatography. It showed the following properties: M.P. 116–119° C., C, 70.48, H, 8.92, N, 2.23, O, 17.06, S, 0.21, titration equivalent 830; bands at the following wavelengths in the infrared spectrum (FIG. 3): 3450, 2910, 2840, 2770, 1740, 1645, 1580, 1464, 1437, 1425, 1376, 1315, 1263, 1230, 1158, 1080, 1045, 960, 900, 838, 763, 715; maxima at 202 m$\mu$.

($E_{1\,cm.}^{1\%}$ 432), 244 m$\mu$ ($E_{1\,cm.}^{1\%}$ 400), 271.5 m$\mu$ ($E_{1\,cm.}^{1\%}$ 302) and 430 m$\mu$ ($E_{1\,cm.}^{1\%}$ 74)

in methanol-1 N HCl in 9:1, maxima at 257 m$\mu$ ($E_{1\,cm.}^{1\%}$ 387), 270 m$\mu$ ($E_{1\,cm.}^{1\%}$ 358) and 415 m$\mu$ ($E_{1\,cm.}^{1\%}$ 90)

in methanol-1 N HCl in 9:1, maxima at 257 m$\mu$ ($E_{1\,cm.}^{1\%}$ 347), 320 m$\mu$ ($E_{1\,cm.}^{1\%}$ 102) and 540 m$\mu$ ($E_{1\,cm.}^{1\%}$ 50)

in methanol-1 N NaOH, (9:1) (FIG. 4); soluble in methanol, ethanol, chloroform, ethyl acetate, acetic acid and insoluble in benzene, ether and petroleum ether; soluble in acid water, insoluble in water, slightly soluble in alkaline water; positive Craven, ferric chloride, Lieberman nitroso reactions and negative ninhydrin, Tollens, 2,4-dinitrophenylhydrazine, sodium nitroprusside reaction; $[\alpha]_D^{27} = +277.5°$ (0.2% methanol), pK'$_a$ 7.78. It was stable in methanol solution showing no loss of activity after 2 hours at 50° C., but it was unstable in alkaline methanol.

There is further provided according to the present invention, the process of producing this substance which comprises cultivating a plurallin-producing strain of *Streptomyces pluricolorescens* in an aqueous carbohydrate solution containing a nitrogenous nutrient under submerged aerobic conditions until substantial antibacterial activity is imparted to said solution and then, if desired, recovering the so-produced substance from the fermentation broth.

The plurallin-producing organism was isolated from a soil sample collected at Kumamoto City, Japan and is a new strain of *Streptomyces pluricolorescens*. The strain has been given the laboratory designations 242-Z2 and A-15, 101 and a slant culture of the living organism has been deposited in the American Type Culture Collection, Washington, D.C. and added to its permanent collection of microorganisms as A.T.T.C. 19145.

*Streptomyces pluricolorescens* has the following characteristics:

(1) Microscopic morphology: Forms branched submerged mycelia from which aerial mycelia grow. Forms no spirals or whorls. Electron microscopy indicated the spores to be smooth-surfaced.

(2) On glycerol nitrate agar at 27° C., pinkish brown growth and pink or beige colored aerial mycelia are formed. The reverse is reddish purple and a wine red soluble pigment is formed.

(3) On glucose asparagine agar at 27° C., reddish yellow growth, yellowish white aerial mycelia with pinkish tinge, and faint yellow to wine red soluble pigment is formed.

(4) On starch agar plate at 27° C., faint yellow growth, beige colored aerial mycelia are formed and yellow to wine red soluble pigment is formed. It shows hydrolysis of starch in medium strength, i.e., diameter of the growth/the hydrolyzed zone shown by iodine reaction was 5–7 mm./15–19 mm.

(5) On calcium malate agar at 27° C., faint brown growth with purplish spots and beige colored aerial mycelia are formed and wine red or slightly brown soluble pigment is formed.

(6) On nitrate (0.2%) peptone water at 37° C., growth is colorless or slightly cream-colored and a scant yellowish white aerial mycelium is formed on the surface. Very slight amount of soluble pigment. Nitrate is reduced very slightly.

(7) On bouillion agar at 37° C., growth is colorless and scant white aerial mycelium is occasionally observed. No soluble pigment.

(8) On Loeffler coagulated serum medium at 37° C., growth is cream-colored and almost no aerial mycelia. Very slight amount of soluble pigment is produced. Coagulated serum is liquefied.

(9) By gelatin stab at 18–20° C., growth is colorless, aerial mycelium is beige, soluble pigment is almost none and gelatin is liquified.

(10) On skimmed milk at 37° C., growth is faint brown, no aerial mycelia, no soluble pigment, peptonization is observed after a slight coagulation.

(11) On blood agar at 37° C., growth is dark brown with greenish tinge, aerial mycelium is light gray, the medium turns to brown slightly and hemolysis is observed.

(12) On potato slice at 27° C., growth is light yellowish brown, aerial mycelium is light yellowish brown, and yellowish brown soluble pigment is produced slightly.

(13) On carrot slice at 27° C., very slight or no growth,

(14) On egg medium at 37° C., growth is dark green-yellow, almost no aerial mycelium and no soluble pigment.

(15) On Pridham Gottlieb medium, mannose, starch, mannitol, dextrin, glycerol, galactose, glucose, xylose, arabinose and maltose are utilized, yielding good growth. Inositol, raffinose, inulin, sorbitol and dulcitol are not substantially utilized, yielding almost no growth. The properties above described are similar to the strain of *Streptomyces plurisolorescens* which produces pluramycins, but the former did not utilize raffinose whereas the latter did utilize raffinose.

EXPERIMENTAL METHODS

Shaking culture: 100 ml. of a medium were placed in Sakaguchi flask of 500 ml. volume and placed on a reciprocating shaking machine which was 120 in strokes and 8 cm. in amplitude.

The disc place method using *Corynebacterium xerosis*: This organism was cultivated in a medium containing 1.0% glucose, 1.0% sodium acetate, 0.5% peptone and 0.5% yeast extract (pH of the medium was 7.0) at 37° C. for 20 hours. One ml. of the cultured broth thus obtained was added to 99 ml. of melted nutrient agar and 8 ml. thereof was plated in a Petri dish which was 9 cm. in diameter. A disc which was 8 mm. in diameter was steeped with a test solution or a standard solution and placed on a plate above prepared and the plate was first placed in an ice box for 3 hours and then placed in an incubator at 37° C.

PRODUCTION AND ISOLATION

Test of carbon sources: Various carbon sources were tested for suitability for plurallin production. The basal medium contained 1.5% soybean meal, 0.1% $K_2HPO_4$, 0.05% $MgSO_4$, $7H_2O$ and 0.3% NaCl and the initial pH was adjusted to 7.0. The production of plurallin using a variety of carbohydrates is shown.

The tests for media suitable for production of plurallin indicated that fructose, glucose and maltose were suitable carbon sources, and soybean meal and cornsteep liquor were suitable nitrogen sources, though it was produced also by starch, sucrose, lactose or glycerol as the carbon source and peptone, meat extract and N–Z amine as the nitrogen source. A medium containing 1.0% glucose, 1.0% fructose, 1.5% soybean meal, 0.1% $K_2HPO_4$, 0.05% $MgSO_4 \cdot 7H_2O$, 0.3% NaCl was one of the media suitable for the production. In the shaking culture using this medium, after 5–6 days, the pH of the broth was 6.2 and units of the active substance were produced. The activity of the substance existed mainly in the liquid part although a slight activity was shown in the extract of the solid mass.

Twenty-five percent of the activity in the cultured broth was transferred into n-butanol or butyl acetate at pH 8.0, but practically no activity was transferred at pH 2.0. During the extraction at pH 8.0, the total activity was reduced and only 10–40% activity was left in the water layer, suggesting the decomposition of the active substance. The active substance in the cultured liquid was adsorbed by an active carbon, but at highest only 10% of the activity was shown in the eluate obtained with 50% aqueous acetone or water saturated with n-butanol.

Thin layer chromatography using alumina and n-butanol-ethanol-water in 4:1:2 and testing by autobiography against *Corynebacterium xerosis* indicated two antibiotics in the culture filtrate: one at Rf 0 and another at Rf 0.5–0.7. The substance of Rf 0.5–0.7 inhibited growth of *Corynebacterium xerosis*. The substance of Rf 0 showed inhibition of zone against *Corynebacterium xerosis* on a disc plate, when a large quantity such as 5 mg. was placed on a disc. The active substance, extracted with n-butanol or butyl acetate at pH 8.0 or eluted from the carbon, showed Rf 0.5–0.7. The main active substance in the culture filtrate was the substance of Rf 0. It was the present agent, plurallin. The methanol extract of the mycelium mass contained the substance of Rf 0.5–0.7 but not the substance of Rf 0.

About fifty percent of the active substance of Rf 0 in the culture filtrate was precipitated at pH 2–4 with HCl and the precipitate could be dissolved in water at pH 7.0. The active substance in the culture filtrate was also precipitated by half saturation with ammonium sulfate and the precipitate was dissolved in water at pH 6.8 with sodium hydroxide. From this solution, the active substance was precipitated by 20–25% saturation with ammonium sulfate. The active substance was of a high molecular weight and was purified by dialysis.

The process, that is, the precipitation from a culture filtrate by half saturation with ammonium sulfate, dissolution in water at pH 6.8 with sodium hydroxide, precipitation by 20% saturation with ammonium sulfate, dissolution in water at pH 6.8, with sodium hydroxide, dialysis against water, precipitation at pH 4.9–5.0 and lyophilization, yielded a powder of the active substance.

The media shown in Table 1, below, were found to be suitable for production of plurallin.

TABLE 1

|  | pH | 4th day activity, μ/ml. | pH | 5th day activity, μ/ml. | pH | 6th day activity, μ/ml. |
|---|---|---|---|---|---|---|
| (1) Glucose 1%; fructose 1%; soybean meal 1.5%; $K_2HPO_4$ 0.1%; $MgSO_4 \cdot 7H_2O$ 0.05%; NaCl 0.3% | 5.4 | 5 | 6.2 | 10 | 6.2 | 10 |
| (2) Glucose 1%; starch 1%; soybean meal 2%; NaCl 0.3% | 6.4 | 5 | 6.8 | 10 | 8.0 | 5 |
| (3) Glucose 1%; starch 1%; corn steep liquor 2%; NaCl 0.3% | 6.4 | 5 | 6.4 | 10 | 6.4 | 10 |

It is to be understood that for the production of the antibiotic, this invention is not liimted to the specific microorganism described herein but also includes the use of microorganisms which are natural isolates, variants or mutants produced from the described organism by mutating agents such as X-rays, ultraviolet rays and nitrogen mustards.

In the submerged, aerobic fermentation of the organism to produce plurallin, the carbohydrate solution used contains, as a source of carbon, a commercially available sugar, other carbohydrate or glyceride oil and as a source of nitrogen inorganic salts such as ammonium sulfate and sodium nitrate and organic materials, often in crude form, such as corn steep liquor, distillers solubles, yeast, soybean meal and when desired mineral salts.

Culture broth, when such is to be employed as the raw material for the process of present invention, may be prepared by inoculating the spores or the culture of a suitable plurallin-producing strain, e.g. a strain of *Streptomyces pluricolorescens*, in a nutrient medium and cultivating under aerobic conditions. As the nutrient source, a nitrogen source such as soybean oil cake, yeast, rice bran, wheat bran, soybean meal, cottonseed meal, peanut meal, sodium nitrate, nitrate and ammonium salts and a carbon source such as a carbohydrate, e.g. fructose, sucrose, maltose, starch and glucose, or a polyhydric alcohol, e.g. glycerol, are employed. Various metal ions may be added in minute or trace quantity if desired. Any substance that can be used for the cultivation and can be assimilated or utilized by plurallin-producing organisms may be employed. Cultivation on solid medium is possible but for the production in large quantity cultivation in liquid medium is preferable. The temperature of cultivation may be varied in a wide range, e.g. 25° C.–40° C., within which the organism may grow and the active substance may be produced but about 28° C. is particularly preferable. Generally, cultivation is continued until sufficient quantity of the active substance is accumulated in the medium and requires 2–5 days.

The following examples illustrates the preparation of a fermentation broth containing the antibiotic, isolation of the antibiotic therefrom and preparation and isolation of the prosthetic group.

EXAMPLE 1

The plurallin-producing strain of *Streptomyces pluricolorescens* was shake-cultured in a medium of 3 liters containing 1.0% glucose, 1.0% fructose, 1.5% soybean meal, 0.1% $K_2HPO_4$, 0.05% $MgSO_4 \cdot 7H_2O$ and 0.3% NaCl. The initial pH of the medium was adjusted to 7.0. The shaking culture was continued for 6 days. The cultured broth of Example 1 was filtered and the filtrate (2480 ml.) contained 20 μ/ml. of plurallin. To this filtrate 930 g. of ammonium sulfate was added and after 2 hours it was centrifuged at 8000 r.p.m. for 10 minutes at 0–2° C. The precipitate was dissolved in distilled water at pH 6.8 with 1 N NaOH. It was placed in a cellulose tube (Visking Co.) and dialyzed against distilled water for 16 hours at 5° C. The inner solution (462 ml., pH 5.4) was adjusted to pH 6.8 with 1 N NaOH and lyophilized, yielding 10.3 g. of powder which showed the potency of 4.76 μ/mg. The yield was 98.9%. This powder was dissolved in distilled water and the volume was adjusted to 515 ml. To this solution 77.3 g. of ammonium sulfate was added and the precipitate was collected by centrifugation. By the method described above, that is, by dissolution, dialysis and lyophilization, 4.32 g. of brown powder showing a potency of 9.55 μ/mg. was obtained. It was dissolved in distilled water and the total volume was adjusted to 432 ml. Then, the pH was adjusted to 4.94 with $H_3PO_4$. After 20 minutes it was centrifuged at 8000 r.p.m. for 10 minutes at 0–2° C. The precipitate was washed with 220 ml., and 120 ml. of water successively and then dried under vacuum, yielding 2.44 g. of a reddish brown powder showing a potency of 19.1 μ/mg.

The powder obtained above was dissolved in water to 2.0% at pH 6.8. Then, the pH was adjusted to 2.0–6.0 and after 20 minutes the solution was centrifuged and the activity and the optical density, at 270 mμ, of the precipitate and the supernatant were determined. The following results were obtained:

TABLE 2

| pH | Precipitate | | Supernatant | |
|---|---|---|---|---|
|  | O.D. (percent) | Activity (percent) | O.D. (percent) | Activity (percent) |
| 2.05 | 67.0 | 58.2 | 33.1 | 41.8 |
| 2.96 | 83.2 | 68.6 | 16.8 | 31.4 |
| 4.14 | 94.8 | 95.7 | 5.2 | 4.3 |
| 4.92 | 94.6 | 95.2 | 5.4 | 4.8 |
| 6.00 | 59.6 | 66.3 | 40.4 | 33.7 |
| 4.07 | 93.2 | 87.3 | 6.8 | 12.7 |
| 4.43 | 92.8 | 91.4 | 7.2 | 8.6 |
| 5.00 | 93.4 | 95.7 | 6.66 | 4.3 |

The activity for inhibition of *Corynebacterium xerosis* was tested. The optical density and the activity in the supernatant and in the precipitate were added and it was taken as 100%.

Column chromatography: 780 mg. (8.7 μ/mg.) which was obtained by precipitation with 20% saturation of ammonium sulfate as above described was dissolved in 60 ml. of distilled water and applied to the column (1320 ml., 5.8 cm. in diameter and 50 cm. in length). The effluent was cut into each 16.5 g. and the fractions showing the absorption at 270 mμ were collected. The substance appeared at 28–43 fractions and its lyophilization yielded 653.9 mg. of the brown powder having a potency of 13.1 μ/mg. As shown in FIG. 3, when pelleted in potassium bromide, plurallin exhibits characteristic absorption bands in the infra-red region of the spectrum at the following wave lengths (expressed in microns): 3320, 3080, 2930, 1640, 1515, 1455, 1385, 1230, 1150, 1065 and 715.

EXAMPLE 2

Preparation of the prosthetic group: A crude plurallin powder, 9.02 g. of 4.8 μ/mg., which was obtained by precipitation with half saturation of ammonium sulfate was treated with 200 ml. of glacial acetic acid twice at 20° C. An amount of 6.748 g. of the undissolved powder showed no activity against *Corynebacterium xerosis*. The liquid part was lyophilized, yielding 2.272 g. of reddish brown powder showing a potency of 17 μ/mg. Thereafter, 1.964 g. of this powder was dissolved in 20 ml. of chloroform and applied to a column of alumina (500 g., 3.5 cm. in diameter, 46 cm. in length). The development was made with chloroform and then elution was made with chloroform-methanol (95:5). The eluate was cut into each 10 ml. Most of the activity (93%) appeared in the eluate of 250 ml. and the vacuum drying yielded 71.5 mg. of brownish red powder showing 443 μ/mg. activity. The singularity of this powder was shown by the thin layer chromatography using alumina (FIG. 5).

The prosthetic group obtained inhibited growth of *Sarcina lutea* at 25 μg./ml., *Mycobacterium phlei* and

*Corynebacterium xerosis* 53K1 at 100 μg./ml., but the following organisms were not inhibited at 100 μg./ml.: *S. aureus* 209p, *S. aureus terajima*, *Micrococcus flavus*, *B. anthracis*, *B. subtilis* PCI 219, *B. sphericus* No. 122, *B. megatherium*, *E. coli* NIHJ, *K. pneumoniae* 602, *S. dysenteriae* A, *S. typhosa* 63T2, *S. paratyphi* A 1015, *S. paratyphi* B 8006, *S. typhimurium* 1406, *S. enteritidis* 1891, *Proteus vulgaris* OX19, *Ps. aeruginosa*, *B. melitensis*, Mycobacterium 607, *Mycobacterium flavum*, *Streptomyces griseus*, *Candida albicans*, *Torula utilis*, *Saccharomyces cerevisiae*, *Trichophyton mentagrophytes*, *Piricularia oryzae* and *Aspergillus niger*. The intraperitoneal injection of 375 μg./mouse caused death of mice but no death was observed by 187.5 μg./mouse.

The prosthetic group shows an ultraviolet spectrum in methanol and acid methanol and an infrared spectrum similar to pluramycin A and thus is apparently structurally related to pluramycin A. Iyomycin $B_1$ has also been shown by infrared and ultraviolet spectra to be related to pluramycin. The prosthetic group herein obtained was, however, different from the pluramycins in its low activity inhibiting microorganisms. Iyomycin $B_1$ was obtained from a cultured mycelium of *Streptomyces phaeoverticillus* by extraction with acetone and is differentiated from pluramycin A by bands in the infrared spectrum, especially at 1250–1200 cm.$^{-1}$. However, the prosthetic group did not inhibit *S. aureus* 209p at 100 μg./ml. but iyomycin $B_1$ inhibited this organism at 1.56 μg./ml. Iyomycin $B_1$ is, moreover, unstable in acid solution but stable in weak alkaline solutions. The isolation of pluramycin B, iyomycin $B_1$ and the prosthetic group obtained herein indicates that Streptomyces produces more than two antibiotics structurally relating to pluramycin A.

The high molecular weight active substance, plurallin, presented herein contained the pluramycin-like prosthetic group characterized above and inhibited HeLa cells in vitro at 2.5 μg./ml. The daily intraperitoneal injection of 62.5 μg./mouse prolonged the survival period of all mice to which a million cells of Ehrlich carcinoma were inoculated. Fifty percent of mice inoculated with the tumor cells survived by daily injection of 31.3 μg./mouse. Daily intraperitoneal injection of 500 μg./mouse for 10 days caused no toxicity to mice. One intraperitoneal injection of 5 mg./mouse caused no death to mice. These results indicate that this antibiotic in the high molecular weight form has a higher therapeutic index to Ehrlich carcinoma in mice than the active prosthetic group.

Among high molecular weight substances, iyomycin A obtained from the cultured broth containing iyomycin B has the closest relationship with plurallin presented herein. Plurallin is, however, different from iyomycin A in the following points; iyomycin A is absorbed on IRC–50 resin in Na-form, but plurallin is not; iyomycin A gives negative Elson-Morgan and Sakaguchi which are positive in plurallin; iyomycin A does not give arginine by hydrolysis but arginine is obtained by hydrolysis of plurallin. Thus, plurallin is differentiated from iyomycin A.

In a disc plate method, solution of 5 mg./ml. of plurallin showed inhibition diameter of about 20 mm. against *Corynebacterium xerosis*. However, the following organisms were not inhibited at 1000 μg./ml. by agar streak method. *S. aureus* 209p, *S. aureus terajima*, *Micrococcus flavus*, *Sarcina lutea*, *Corynebacterium xerosis*, *B. anthracis*, *B. subtilis* PCI 219, *B. sphericus* No. 122, *B. megatherium*, *E. coli* NIHJ, *K. pneumoniae* 602, *S. Dysenteria* A, *S. typhosa* 63T2, *S. paratyphi* B 8006, *S. typhimurium* 1406, *S. enteritidis* 1891, *Proteus vulgaris* OX19, *Ps. aeruginosa*, *B. melitensis*, Mycobacterium 607, *Mycobacterium flavum*, *Streptomyces griseus*, *Candida albicans*, *Torula utilis*, *Saccharomyces cerevisiae*, *Trichophyton mentagrophytes*, *Piricularia oryzae* and *Aspergillus niger*.

We claim:

1. A member selected from the group consisting of an antibiotic substance, designated plurallin, effective in inhibiting the growth of *Mycobacterium phlei* and *Corynebacterium xerosis* 53 Kl, containing among others the amino acids lysine, histidine, ammonia, arginine, aspartic acid, threonine, serine, glutamic acid, proline, glycine, alanine, crystine, valine, methionine, isolecine, leucine, tyrosine and phenylalanine, being soluble in water, methanol and butyl acetate and containing 50.01% carbon, 7.23% hydrogen, 10.89% nitrogen, 25.74% oxygen and 0.94% sulfur, exhibiting when dissolved in 0.1 N NaOH maximum absorption of ultraviolet light at 245–275 mμ.

$$E_{1cm.}^{1\%} = 76 - 56)$$

having a molecular weight as determined by chromatography of 30,000–60,000 and exhibiting when pelleted in potassium bromide characteristic absorption spectra in the infrared region of the spectrum at the following micron wave lengths 3320, 3080, 2930, 1640, 1515, 1455, 1385, 1230, 1150, 1065 and 715 and salts thereof.

2. An antibiotic according to claim 1 in substantially pure form.

3. A process for the production of a fermentation broth containing the antibiotic described in claim 1 which comprises cultivating *Streptomyces pluricolorescens* A.T.C.C. 19145 in an aqueous carbohydrate broth solution containing a nitrogen nutrient under submerged aerobic conditions until substantial antibacterial activity caused by the presence of said antibiotic is imparted to said solution.

4. The process of claim 3 which includes the step of recovering the antibiotic from the broth.

References Cited

Maeda et al., Journal of Antibiotics, vol. IX, No. 2, March 1956, pp. 75–81.

JEROME D. GOLDBERG, Primary Examiner

U.S. Cl. X.R.

195—80